Patented May 9, 1939

2,157,861

UNITED STATES PATENT OFFICE 2,157,861

PARASITICIDAL COMPOSITIONS

Alexander A. Nikitin, Newark, and James F. Adams, Wilmington, Del., assignors to Walter C. O'Kane, Durham, N. H., and Paul Moore, Washington, D. C., as trustees of Crop Protection Institute, Washington, D. C., an association No Drawing. Application September 19, 1936, Serial No. 101,674

16 Claims. (Cl. 167—16)

The present invention relates to novel parasiticidal compositions and methods of making the same, and more particularly to fungicidal compositions containing copper derivatives.

In prior Patent No. 2,040,811 there was disclosed the production of novel types of fungicidal materials, including copper zeolites. While such fungicidal materials as are disclosed in the prior patent have proved valuable in practice, the methods of manufacturing such copper zeolites were somewhat more expensive than is most desirable in commercial exploitation. Other factors also affected the situation.

Aside from the copper zeolites of the prior patent referred to, copper fungicides on the market offer a number of difficulties from the standpoint of safety with respect to the plant hosts, and also from the standpoint of fungicidal activity, since in many of the copper fungicides on the market, the copper is not present in a form in which it exercises substantial fungicidal action.

Among the objects of the present invention is included the improvement of copper fungicides generally to increase their fungicidal action, while at the same time insuring safety with respect to the plant hosts.

Still further objects include the production of novel types of zeolitic type copper fungicides.

Still further objects include novel methods of preparation of fungicides, particularly of the copper type.

Other and further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with the present invention, copper-containing fungicides of enhanced parasiticidal activity and great safety for plant use, are produced by utilizing with such copper fungicides, soluble salts of polybasic acids containing replaceable hydrogen, such soluble salts desirably being in combination chemically in the copper-containing fungicidal material, although physical admixtures may also be employed. As illustrative of the soluble salts of polybasic acids that can be employed, particular reference is made to the utilization of the alkali metal phosphates, such as mono or di-sodium phosphate, the ammonium phosphates of similar character, arsenates, oxalates, citrates, etc., since the polybasic acid employed may be either organic or inorganic. However, the phosphates offer the most desirable form of materials to be used in this connection, and are employed below to illustrate the invention.

The utilization of these polybasic acid salts in the improvement of fungicides, particularly copper-containing fungicides, is illustrated below, particularly with respect to the zeolitic types of copper fungicides.

The so-called copper zeolites resulting from the reaction of a soluble copper salt, such as copper sulphate, and sodium alumino silicate has been extensively used in the form of sprays and dusts to control fungus diseases during the last several years on apples, pears, grapes, etc. The copper alumino silicate produced in such cases, from sodium alumino silicate containing more or less the theoretical amount of alkali, results in a compound $CuO.Al_2O_3.3SiO_2.nH_2O$ containing about 14–17% of copper. In the production of such materials from water glass or sodium silicate with sodium aluminate, constituting the first stage of the reaction to produce the sodium alumino silicate, washing is utilized to remove excess of alkali, and is not particularly economical because among other things, the process is slowed down by involving relatively slow operations, including decantation, there is considerable loss of material in the form of finely suspended particles, a large bulk of water is required, and the resulting product, namely the copper alumino silicate contains only from 14 to 17% copper.

The hereinbefore described method of making the copper zeolites can be modified to speed up the process, and to increase the copper content of the resulting materials by utilizing sodium alumino silicate containing an excess of alkali above the theoretical amount, and reacting such sodium alumino silicate with copper sulphate. In this way, it is possible to increase the copper content in the resulting copper fungicide up to 28%. And by the elimination of the washing step for reducing the alkali content of the sodium alumino silicate, the process for manufacturing the material is considerable hastened. The resulting product is very toxic to spore germination, and has a high effective copper content running from about 25–35%. It is not, however, very safe for use, and injuries to plant hosts may occur due to the presence of impurities, and there may also be some russeting on fruit. The impurities present are probably in the nature of basic copper sulphate and copper hydroxide. The use of an excess of alkali in the sodium alumino silicate results in a reaction which is more difficult to control than when it is absent, and it is also difficult to remove undesirable impurities or impractical to do so. The amount of these impurities, such as basic copper sulphate, copper hydroxide, basic aluminum sulphate, etc., may vary considerably, and thus affect the physical, chemical and toxic properties of the resultant copper fungicide. To this extent, therefore, the reaction which involves the use of an excess of alkali, results in rather wide variation in the composition of the final product, due particularly to the stated side reactions and impurities present.

The basic copper sulphate and cupric oxide each have a lower toxicity to spore germination than does the copper zeolite material. Further cupric oxide is an unstable copper compound, and when a large excess of it is present with other copper fungicides, it darkens with age causing the formation of a material which is practically inert to spore germination. The presence of such copper ingredients which have a weak toxicity to spore germination, and cause injury to plants, cannot practicably be removed from the copper alumino silicate. To the extent, however, that these methods reduce the cost of manufacture and improve the process of making the materials, and increase the copper content of the final product, they deserve consideration.

Another method that can be utilized for the preparation of the copper zeolites is to produce such materials by the use of water glass, aluminum sulphate and sodium hydroxide, and copper sulphate. While the copper alumino silicate, such as $CuO.Al_2O_3.3SiO_2.6H_2O$, is produced in such cases, certain undesirable factors enter into the process. Excessive amounts of sodium hydroxide are required to increase the yield of sodium aluminate. The reactions involved are difficult to control and result in a number of impurities as a result of side reactions. Besides the copper alumino silicate, basic copper sulphate and copper hydroxide, the latter decomposing on aging into copper oxide and water are formed, which substances are likely to give rise to undesirable action, as pointed out above in connection with the second method referred to. In addition to the sodium aluminate formed from the reaction of the aluminum sulphate with sodium hydroxide, aluminum hydroxide, basic aluminum sulphate, and sodium sulphate will generally be present, so that only a portion of the aluminum combines to form the soluble sodium aluminate, the remainder forming insoluble aluminum hydroxide and basic aluminum sulphate, which latter compounds do not enter into the reaction with water glass, and would not, therefore, result in the formation of the sodium zeolite desired for reaction with copper sulphate. The resulting fungicidal material produced by this method, although very toxic to spore germination, is not very safe and may cause some russeting on fruit.

More desirably, therefore, the copper zeolitic type of fungicide is produced in the presence of soluble salts of the polybasic acids with replaceable hydrogen, particularly such as the acid phosphates of the alkali metals to produce zeolitic type compounds of the greatest safety in use, although exhibiting high fungicidal activity, and also containing greater amounts of copper than is present by the more desirable methods of producing copper zeolites. Illustrated by the use of the soluble phosphates, this improved method involves the utilization of soluble phosphates, sodium alumino silicate or silicates in general, and copper sulphate to produce the resulting copper compound. It may be looked upon as the reaction product from a copper cation on the one hand produced, for example, from a soluble copper salt, such as copper sulphate, with two anion radicals, such as alumino silicate and phosphate, desirably utilized in the form of sodium alumino silicate and soluble phosphates, respectively. New compounds are obtained that may be represented generally by the formula $(CuO)_xAl_2O_3.nSiO_2(PO_4)_y.6H_2O$, among which may be particularly mentioned the compound $(CuO)_4Al_2O_3.3SiO_2.P_2O_5.6H_2O$.

Such compounds exhibit a high toxicity and a great safety factor, since they do not contain any basic copper sulphate, and practically the entire copper content is present in the form of the copper alumino silico phosphate material. The total copper content of the material can be increased up to 35%, and can be readily adjusted within desired limits as close as 1%. These copper alumino silico phosphates are very toxic to spore germination, and very safe toward fruit and foliage.

The preparation of the copper alumino silico phosphates may be carried out in any desired way, desirably the soluble copper salt being added to the reaction mixture containing the other ingredients. Thus the copper salts, such as copper sulphate, may be permitted to react with the sodium alumino silicate and the desired soluble phosphate. While sodium alumino silicate can be utilized which is substantially free from excess alkali, produced as indicated above by washing the reaction product of sodium aluminate and water glass, with the production of a resulting material of high copper content, in the production of these zeolitic type materials utilizing the phosphates and related materials referred to above, it is unnecessary to utilize sodium alumino silicate of low alkali content, but substantial amounts of alkali in excess of the theoretical may be present, in view of the fact that the phosphates present neutralize any alkali present and avoid the deleterious actions and side reaction products obtained in the instances referred to above where excess alkali is present. Thus the utilization of the soluble polybasic salts of acid character may be looked upon as a substitution of neutralization for the washing required in the other processes. It may be noted, however, that this process of neutralization with the polybasic acid salts, such as monosodium phosphate or di-sodium phosphate, or similar ammonium phosphates, etc., results in copper compounds whose properties from a fungicidal standpoint are far superior over any other known copper fungicide. In general it may be stated that not only is a very feasible process thus developed for the production of the copper fungicides, but the fungicides have very desirable properties greatly surpassing those of known fungicides, since the copper in the form resulting from such methods is more toxic per unit of copper to spore germination than any copper compound heretofore utilized as a fungicide, exceeding in this respect even the copper zeolite prepared from a sodium alumino silicate containing an excess of alkali. Field tests with the copper alumino silico phosphate prepared by the processes herein set forth show practically no injury to fruit and foliage, even when used at higher concentration than necessary to control fungus diseases.

The amount of soluble acid salts of the polybasic acids employed, may depend on the amount of excess of alkali present in the composition. But the various proportions of ingredients employed may be varied within substantial limits. The methods of neutralization of excessive amounts of alkali by the use of the polybasic acid salts, particularly exemplified in the phosphates, results in a number of important advantages in the manufacture of the fungicides containing such materials, among which the more important are the following:

In the first place, the method of neutralization, such as with phosphates, is extremely efficient and economical as it eliminates the washing process of the intermediate product, such as sodium zeolite, to remove free alkali. Furthermore, phosphates and other polybasic acid salts as indicated above when utilized in the production of the modified zeolitic types of material, avoid losses of material in the form of finely divided particles in the form of fine suspensions.

An important feature is as pointed out above the fact that the phosphates and other analogous materials materially prevent the formation of by-products, such as basic copper sulphate and cupric oxide, which by-products are very injurious to fruit and foliage, causing severe russeting. Further, such by-products as basic copper sulphate and copper hydroxide are less stable, and show inferior toxic properties as compared with the zeolitic compounds.

The use of the phosphates and analogous materials enable the content of the fungicidal material to be increased up to, for example, 35%, while at the same time practically 100% of the copper is in the form of copper alumino silico phosphate or analogous material. Thus the copper derivatives produced under the present method contain not only a high copper content, but they are substantially free from cupric hydroxide, basic copper sulphate and cupric oxide. The copper alumino silico phosphate and analogous materials are very readily dispersed, and are far more toxic to spore germination than any copper compound heretofore known, particularly when used as a spray material. The copper in this form is not injurious to fruit and foliage, probably because the copper present is in the form of copper alumino silico phosphate with no basic copper sulphate present.

The products obtained are uniform in composition, and the copper content in the final product can be readily adjusted within close limits, as 1%. This result contrasts with that when excess alkali is employed in the production of copper aluminum silicate, in the latter of which even variation in copper content may be attributed to the formation of different copper compounds, such as basic copper sulphate, copper hydroxide, etc. in varying proportions.

Copper alumino silico phosphate remains very stable at high temperatures (125° C.), which temperatures do not adversely affect the composition, color or toxic properties. The chemical stability of such copper compounds is, therefore, an important factor when elevated temperatures are employed in the manufacture and process, as in drying operations.

The presence of the phosphates has a very important effect on the physical properties of the copper fungicides, because they reduce the resistance to abrasion—an important economical factor in reducing the cost of grinding. In the grinding of these copper fungicides, it is generally important to reduce the particle size to about 350–400 mesh. The lowering of resistance to abrasion is a major factor in this result.

The phosphates, etc., also act as caking inhibitors during the preparation of the copper derivatives. In this way, completeness of the reaction between sodium zeolite, for example, and copper sulphate is assured. The presence of the phosphate also acts as a powerful dispersing agent of the resultant copper alumino silico phosphate.

It is possible to adjust the pH value of the final material to a desired point, and to extend the use of the copper fungicide to a greater number of plants. Furthermore, the presence of the phosphate component increases the buffering action of the new copper fungicide. The combined action of alumino silicate and phosphate increases considerably the buffering action of the new copper fungicides against excessive solving action of the organic acid liberated by fruit and foliage. This higher buffering action greatly reduces any injurious effect of the resultant copper fungicide in the form of spray or dust on fruit and foliage, and permits the extension of its use on plants which are super-sensitive to copper sprays.

Comparative toxicity tests of the copper alumino silico phosphate as compared with copper zeolites and other copper compounds, with respect to *Macrosporium solani* and *Glomerella cingulata* spores has shown that the copper alumino silico phosphate is even more toxic than copper zeolites when prepared from sodium alumino silicate containing an excess of alkali above the theoretical, and further that the copper alumino silico phosphate is vastly more effective than copper phosphate, basic copper sulphate, or copper oxide, the tests having been run under identical conditions, except for the difference in the copper compounds tested.

The following is a specific exemplary method for the production of the copper alumino silico phosphate, illustrating a preferred manner of procedure and proportions of ingredients, without, however, intending any limitation to either the particular order of steps or the proportions of ingredients. 250 parts by weight of water glass dissolved in 4630 parts of water are treated with 120 parts by weight of sodium dihydrogen phosphate ($NaH_2PO_4.H_2O$) dissolved in 2000 parts of water. The mixture is then reacted with 78.5 parts of sodium aluminate dissolved in 2060 parts of water. The resulting gel is desirably permitted to stand for 3 hours, after which 5000 parts by weight of water are added with stirring, 370 parts by weight of copper sulphate ($CuSO_4.5H_2O$) in solution as a 5% solution are added with stirring until the pH of the mixture is approximately 6.7. The final mixture is desirably permitted to age for 4 hours, pressed over night, dried and washed to remove soluble sulphuate, and again dried. The resulting product showed the following proximate analysis:

| | Percent |
|---|---|
| $Al_2O_3$ | 11.7 |
| $SiO_2$ | 19.6 |
| CuO | 31.6 |
| $P_2O_5$ | 16.7 |
| $H_2O$ | 20.4 |

The copper content is equivalent to 25.4% Cu.

While the invention has been particularly exemplified in the production of what has been described as zeolitic types of materials, the salts of the polybasic acids containing replaceable hydrogen, are useful for a wide variety of purposes in connection with other fungicidal and insecticidal compositions for stabilization, etc., and particularly other types of copper-containing fungicides. Thus the addition of phosphates can be extended to copper-lime in the form of a spray or dust. In such case there is not only an improvement in fungicidal efficiency, but it is possible to reduce the lime content of the copper-lime, thus making Bordeaux safer to foliage. The reduction in the lime content minimizes the up-set to transpiration. Furthermore, there is a reduction in the residue which remains on the foliage.

The phosphates and related materials can also be utilized with copper silicates, such as those obtained from the reaction of soluble copper salts with soluble silicates, such as sodium silicate.

Accordingly, the phosphates and other acid salts of polybasic acids are particularly of value for extending the use of copper fungicides by adjusting the physical and chemical properties, including the pH values, etc.

The zeolitic types of fungicides produced in accordance with the present invention may be utilized from reactions involving either natural zeolites for the production of the copper fungicides, or of the synthetic zeolites, such as the permutits. The fungicidal materials may be used in any desired form, such as sprays, dusts, dispersions, etc. The materials, such as the copper alumino silico phosphates, may be admixed with other desired fungicidal and insecticidal components, both vegetable and synthetic. Thus they may be utilized in the form of a dust with derris or rotenone, pyrethrum, etc. Due to the fact that it is unnecessary to have lime present in such dust to any substantial extent, the incompatibility of lime with vegetable insecticides is avoided, and a very effective dust is secured.

As pointed out above, it is believed that the copper containing materials, such as the copper alumino silico phosphate referred to above, are definite chemical entities. It is possible, however, that in such complex combinations various combinations of the ingredients resulting in a proximate formulation as indicated above may be present. Thus it is possible that phosphates in the form of insoluble materials, such as copper phosphate are adsorbed in, for example, the copper alumino silicate. Regardless, however, of what explanation may be offered for the components of the composition, copper alumino silico phosphate and related materials produced in accordance with the present invention, whether individual chemical compounds, or whether entities associated and held together by surface forces, have given unique results as fungicides, as pointed out above.

While as set forth above, the salts of polybasic acids containing replaceable hydrogen have been particularly emphasized for use, especially when the sodium alumino silicate employed in the reaction contains excess alkali, it is possible to use the salts of the polybasic acids which do not contain replaceable hydrogen, such as trisodium phosphate if there is no substantial amount of alkali to be neutralized. The action of the phosphates in such cases is, except for the fact that no neutralization of excess alkali is produced, substantially the same in the production of, for example, copper alumino silico phosphate, as in the cases where the acid salts are employed.

Furthermore, while soluble salts of the polybasic acids have been particularly referred to and are the preferred form of the invention, since insoluble salts of the polybasic acids containing replaceable hydrogen will also exert a neutralization effect on excess alkali that may be present in the components, such as the sodium alumino silicate, the insoluble salts may be employed if desired.

Having thus set forth our invention, we claim:

1. A parasiticidal composition containing a copper zeolite including the anion of a polybasic acid.
2. A parasiticidal composition containing a copper zeolitic phosphate.
3. A parasiticidal composition containing the reaction products of a soluble alumino silicate, a soluble salt of a polybasic acid containing replaceable hydrogen, and a soluble copper salt.
4. A parasiticidal composition containing the reaction products of a soluble alumino silicate, a soluble phosphate containing replaceable hydrogen, and a soluble copper salt.
5. A parasiticidal composition containing a copper compound of a base exchange material having the copper present in the base exchange portion of the base exchange material, said compound including the anion of a polybasic acid.
6. A parasiticidal composition containing a copper compound of a base exchange material having the copper present in the base exchange portion of the base exchange material, said compound including the anion of phosphoric acid.
7. A parasiticidal composition containing a copper alumino silico phosphate.
8. The compound $(CuO)_4Al_2O_3 \cdot 3SiO_2 \cdot P_2O_5 \cdot 6H_2O$.
9. A parasicitidal composition containing a copper fungicide and a phosphate.
10. A parasiticidal composition containing a copper fungicide containing free alkali and a soluble phosphate having replaceable hydrogen.
11. A parasiticidal composition containing the reaction product of a copper fungicide containing free alkali and a soluble acid phosphate.
12. The method of producing fungicidal materials which comprises forming a copper zeolite in the presence of a soluble salt of a polybasic acid containing replaceable hydrogen.
13. The method of producing fungicidal materials which comprises forming a copper zeolite in the presence of a soluble acid phosphate.
14. The method of producing fungicidal materials which comprises reacting a soluble copper salt with sodium alumino silicate in the presence of an acid salt of a polybasic acid.
15. The method of producing fungicidal materials which comprises reacting a soluble copper salt with sodium alumino silicate in the presence of a soluble acid phosphate.
16. The method of treating ecenomic crops to protect them against parasitic fungi which comprises applying thereto a copper alumino silico phosphate.

ALEXANDER A. NIKITIN.
JAMES F. ADAMS.

CERTIFICATE OF CORRECTION.

Patent No. 2,157,861. May 9, 1939.

ALEXANDER A. NIKITIN, ET AL.

It is hereby certified that error appears in the printed specification of the above numbered patent requiring correction as follows: Page 3, second column, line 64, for "sulphuate" read sulphate; page 4, second column-line 65, claim 16, for "ecenomic" read economic; and that the said Letters Patent should be read with this correction therein that the same may conform to the record of the case in the Patent Office.

Signed and sealed this 29th day of August, A. D. 1939.

(Seal)

Leslie Frazer,
Acting Commissioner of Patents.